United States Patent [19]

Schroder

[11] 3,791,889

[45] Feb. 12, 1974

[54] FUEL COMPOSITION CONTAINING LITHIUM, CALCIUM AND FLUOROCARBON

[76] Inventor: Johann Schroder, Drimbornallee 125A, Aachen, Germany

[22] Filed: Mar. 27, 1972

[21] Appl. No.: 238,474

Related U.S. Application Data

[63] Continuation of Ser. No. 860,977, Sept. 25, 1969, abandoned.

[52] U.S. Cl.............. 149/19.3, 149/87, 264/3 R
[51] Int. Cl.............................................. C06d 5/06
[58] Field of Search .... 149/19, 87; 264/3 R; 60/219

[56] References Cited
UNITED STATES PATENTS

| | | | |
|---|---|---|---|
| 3,156,595 | 11/1964 | Camp et al. | 149/87 |
| 3,203,171 | 8/1965 | Burke et al. | 149/87 X |
| 3,441,455 | 4/1969 | Woods et al. | 149/19 X |
| 3,152,935 | 10/1964 | Cadwallader | 149/87 X |
| 3,235,422 | 2/1966 | Stang | 149/19 |
| 3,353,349 | 11/1967 | Percival | 149/87 UX |
| 3,619,306 | 11/1971 | Berthmann | 264/3 R X |
| 3,388,554 | 6/1968 | Hodgson | 60/219 X |

Primary Examiner—Carl D. Quarforth
Assistant Examiner—E. A. Miller
Attorney, Agent, or Firm—Frank R. Trifari

[57] ABSTRACT

A fuel for producing calorific energy by reaction with $SF_6$, the fuel containing mostly lithium and a solid highly fluorinated compound.

6 Claims, 1 Drawing Figure

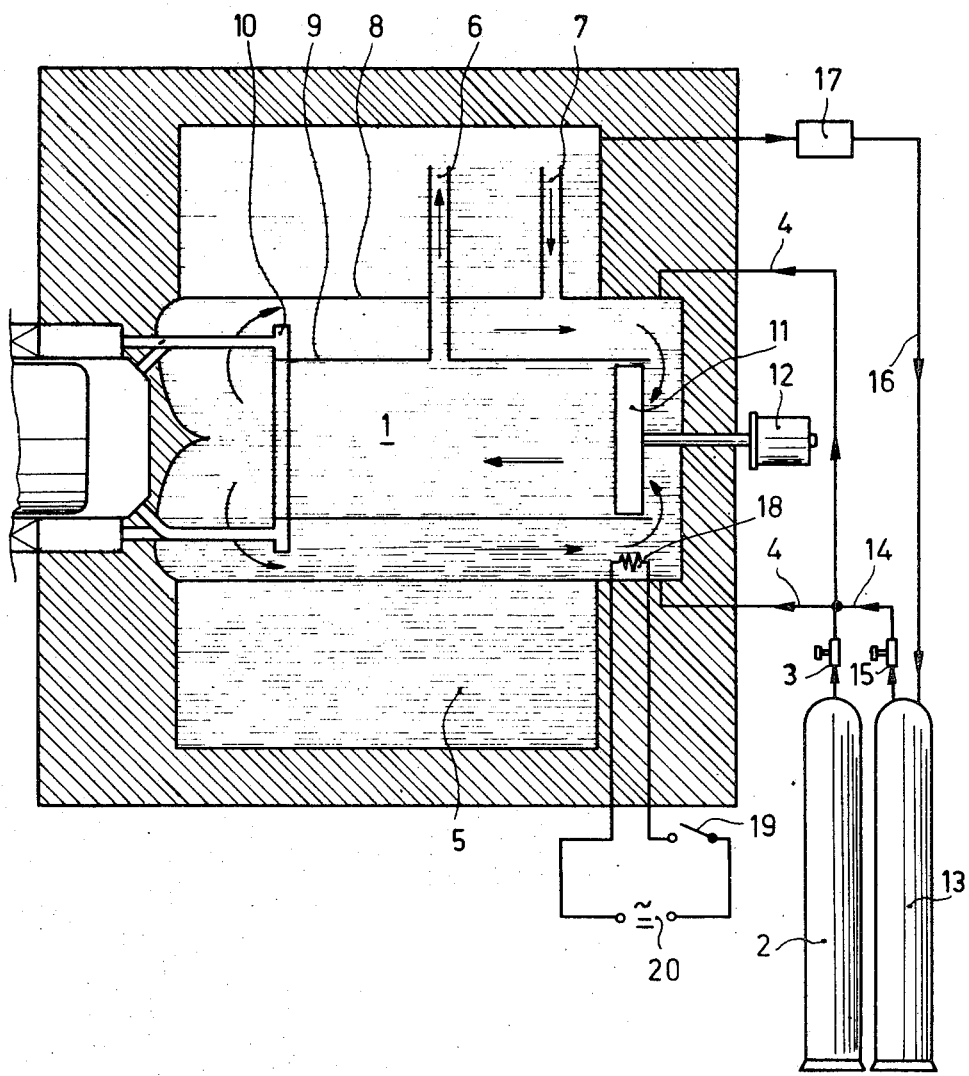

FUEL COMPOSITION CONTAINING LITHIUM, CALCIUM AND FLUOROCARBON

This is a continuation of U.S. Pat. application Ser. No. 860,977, filed Sept. 25, 1969, now abandoned.

A method of producing calorific energy is known from U.S. Pat. specification No. 3,325,318 in which as a fuel lithium or an alloy or mixture of lithium and one or more metals chosen from the group formed by aluminium, calcium, potassium, magnesium and sodium is reacted with $SF_6$ in a chemical reactor. According to this Patent Specification an alloy suitable for this purpose comprises at least 50 percent by weight of lithium, remainder aluminum and/or up to 25 percent by weight of a metal from the group formed by sodium, potassium, beryllium, magnesium and calcium. The reaction is effected under circumstances such that a solid reaction product containing lithium sulphide (softening point approximately 950° C) and lithium fluoride (softening point 848° C) is formed.

It was recognized that it is desired in certain types of chemical reactors to carry out the reaction of $SF_6$ with lithium or with the said lithium alloys at temperatures which lie above the melting points of the said metals and the reaction products formed. As a result it is possible to circulate the metal melt and to separate the products of reaction from the metal melt.

The reaction of sulphur hexafluoride with lithium or a lithium containing mass can, however, be started in such a reactor only after the mask has been melted. If it is desired to utilize the full output of the engine as quickly as possible, it is additionally preferred to preheat the metal mass up to the operating temperature (700° to 900° C).

It is possible as such to preheat the metal mass electrically or, if the reactor is coupled to a hot gas engine, to drive the engine by means of an external energy source in such a way that the engine operates as a heating pump. Both possibilities are comparatively time-consuming, which is of course also dependent on the quantity of mass to be heated and the temperature to be reached.

An object of the invention is to provide a lithium containing fuel which is suitable for producing calorific energy by means of reaction with $SF_6$ and the temperature of which can be brought to the desired operating temperature very quickly, that is to say, within a few seconds.

According to the invention such a fuel is characterized in that it comprises an intimate mixture of lithium or a mixture or an alloy of lithium with one or more metals chosen from the group formed by aluminum, calcium, potassium, magnesium and sodium, and a carbon compound which is solid or highly viscous at room temperature, the valences of the carbon atoms not used up in the carbon-to-carbon bonds being either all saturated with fluorine or partly with fluorine and partly with chlorine, and this at a-ratio of metal to carbon compound such that upon ignition of the mixture exactly such a quantity of the metal reacts with the carbon compound that the heat released thereby is at least sufficient to melt the reaction products formed and the part of the metal which has not been converted during the reaction.

Such a fuel can be obtained by mixing the components of the mixture with or without the use of a volatile organic solvent.

Thermodynamical data which are known as such make it possible to calculate in a simple manner for any desired starting temperature and quantity of metal to be reacted with $SF_6$ with which quantity of the carbon compound this quantity of metal must be mixed to reach the desired temperature upon ignition.

The mixture of metal and fluorocarbon compound may be ignited electrically, for example, by sparkover between two electrodes or with the aid of a filament. Ignition may alternatively take place chemically. To this end, for example, a small quantity of sulphur is placed in front of a gas inlet which terminates in the fuel mixture. A small quantity of fluorine or halogen fluoride (for example, $ClF_3$) is introduced into the mass through the gas inlet. The sulphur reacts therewith immediately while fire phenomena occur so that the mass is ignited. Instead of using sulphur it is alternatively possible to use other substances reacting at room temperature with fluorine or halogen fluoride while fire phenomena occur such as carbon and solid hydrocarbon compounds.

After ignition, the previously fixed temperature is reached within a few tenths of a second to a few seconds.

Any aliphatic and aromatic carbon compound in which the valences of the carbon atoms, not used up in the carbon-to-carbon bonds are saturated with fluorine may in principle be used as a carbon compound. In some cases it may be desirable on account of technological considerations that also a number of chlorine atoms is present in the compound. This may be the case, for example, when the mixture of metal and fluorocarbon compound is prepared while using a solvent, and when the compound consisting entirely of fluorine and carbon is insoluble or less soluble than an analogous compound in which part of the fluorine atoms has been replaced by chlorine. The fluorocarbon compounds to be used must not contain hydrogen and nitrogen and preferably contain not more than 10 Atom percent of sulphur and/or oxygen. Suitable substances are, for example, non-volatile products which are obtained during perfluorination of some hydrocarbon compounds. The products may contain up to 20 atom percent of chlorine. Also polytetrafluoroethylene is suitable under circumstances for the object envisaged.

However, solid fluorocarbon compounds or fluorochlorocarbon compounds are preferably used which have a wax-like or fatty consistency at room temperature. When using such compounds it is possible to provide each metal particle with a thin film of the compound. In addition to an intimate mixture, a better mouldability of the mixture is obtained in this manner. In addition demixing which is, for example, possible in mixtures of powders cannot occur during storage and transport. In this connection, the polymonochlorotrifluoroethylene having a mean molecular weight between approximately 900 and 10.000 has been found to be very suitable.

It is to be noted that a fluid slurry consisting of a finely dispersed alloy of lithium and aluminium and/or other light metals in a fluorochlorocarbon oil for producing heat is known from U.S. Pat. specification No. 3,156,595. The slurry contains approximately 75 percent by weight of the oil which has a composition of $(C_2F_3Cl)_n$. Lithium is present in a quantity of 3 to 4 percent by weight, the remainder comprises aluminum or a mixture of aluminum and other light metals. The heat produced is converted into electrical energy.

The mixture according to the present invention is principally distinguished from this known mass:

The quantity of the solid fluorocarbon compound is proportioned in such a manner that only a part of the quantity of metal is converted, the maximum quantity being 30 percent by weight for reaching temperatures of up to 1,000°C. The heat released serves to heat the non-converted part of the metal and the fluorides formed during the reaction up to at least a temperature at which these have melted and preferably up to the operating temperature which is desired for the conversion of the metal with $SF_6$.

The mass according to the invention may be prepared, for example, as follows:

Lithium or an alloy of lithium containing one or more metals chosen from the group formed by aluminum, calcium, potassium, sodium, magnesium is finely powdered so that the mean grain diameter is between 5 and 100 $\mu$m. If desired, also pulverulent mixtures of the said metals may be used. The metal powder is dispersed in a solution of poly(monochlorotrifluoroethylene).

The solvent may, consist of, for example, a liquid hydrocarbon such as hexane, heptane, benzene, xylene. The solution may contain, for example, between 5 and 50 percent by weight of the macromolecular substance. The solvent is removed under a vacuum while steadily stirring at temperatures between 20° and 60° C. The ultimate mass can satisfactorily be moulded. Upon ignition a reaction occurs at which, as a function of the quantity of poly(monochlorotrifluoroethylene) present which may amount to 5 to 30 percent by weight as calculated on the mixture, temperatures of between approximately 200° C and 1,000° C are reached within a few seconds.

When moulding the metal fluorocarbon compound not all pores will disappear from the mixture, and it is often also desired for a given pore volume to remain available to take up the thermal expansion of the metal mass. To prevent high gas pressures from occurring during the reaction, it is preferred to mould the mixture in an atmosphere consisting of a gas or a mixture of gases which also react with the mixture of metals present in the mass at temperatures above approximately 100° C while forming non-gaseous products. Gases suitable for this purpose are $SF_6$ and volatile fluorocarbon compounds such as $CF_4$, $C_2F_6$, $CClF_3$, etc.

Such a fuel which contains lithium and calcium in a ratio of gram atoms of substantially 4 : 1 is, for example, suitable to be used in a chemical reactor which comprises at least two interconnected spaces and a pump, and in which sulphur hexafluoride in a melt containing lithium and calcium is introduced into one of the spaces (the reaction space) and that at least part of the metal melt and the molten mixture of salts formed during the reaction is introduced through a pump into a second space in which the salt melt is separated from the metal melt, whereafter the metal melt is returned to the reaction space.

The ratio of gram atoms between lithium and calcium in the fuel is chosen to be such that the formed fluorides as much as possible form an eutectic mixture during the reaction, in which mixture, the greater part of the sulphides formed during the reaction has been dissolved. This provides the possibility of carrying out the reaction at temperatures between 700° and 900° C which is a particularly suitable temperature range for supplying calorific energy to a so-called hot gas engine operating in accordance with the stirling principle.

Alloys of the composition 41 percent by weight ± 3 percent by weight of lithium, remainder calcium ( in gram atoms approximately 4 : 1) and the usual impurities (in practice usually a total of less than 1 percent by weight) are found to be satisfactorily suitable for this purpose. The volume of such an alloy remains substantially constant during the reaction with $SF_6$. The lithium-calcium alloy is brittle and can therefore be pulverised satisfactorily. The alloy can be handled in air. The combination of lithium and calcium in the given ratio provides the greatest quantity of energy at conversion with $SF_6$ at 850° C per unit volume as compared with all other elements and feasible combinations of elements. The alloy may contain up to 30 atom percent of sodium and/or magnesium. The alloy may be introduced as such into the reactor or as a pulverulent mixture of the separate metals.

The fuel according to the invention may be used to bring metals to be reacted with $SF_6$, for example, Li and Ca in the ratio of 4 to 1 in gram atom quickly to the operating temperature in a chemical reactor.

It is evident that it is not necessary for all spaces to be filled with the fuel according to the invention in a chemical reactor which consists of at least two interconnected spaces one of which forms the actual reaction space and the other space(s) serve(s) as container(s). In many cases, it is sufficient to fill only the reaction space with the fuel according to the invention which fuel then functions as a starting mixture. The metal mass contained in the spaces serving as containers may be brought to the operating temperature with the aid of the reaction heat released during the conversion of the metal mass with $SF_6$ in the reaction space. A condition is then, however, that there is a heat-exchanging contact between the reaction space and the other spaces.

In order that the invention may be readily carried into effect, an example thereof will now be described in in detail with reference to the accompanying diagrammatic drawing in which the only FIGURE shows a chemical reactor.

EXAMPLE

An alloy was prepared from lithium and calcium in an atomic ratio of 4 to 1 by melting them together.

The metal melt obtained was poured into moulds, the filled moulds were quickly cooled and the mouldings obtained were broken and subsequently pulverized.

A fraction of the metal powder obtained having a grain diameter of approximately 20 $\mu$m was dispersed in a vessel in a 20 percent by weight solution of polymonochlorotrifluoroethylene having a mean molecular weight of approximately 1,000, in hexane.

The quantities of these substances were chosen to be such that 15 gms of poly(monochlorotrifluoroethylene) was available per 85 gms of metal powder. The solvent was removed in a vacuum while steadily stirring at a temperature of 50° C of the dispersion. The mixture obtained in this manner is paste-like. Mouldings having a pore volume of 7 vol. percent were formed in an $SF_6$ atmosphere.

The mouldings obtained were ignited. After finishing the reaction which proceeded within a few seconds the temperature of the mass was 850° C. The volume of the mass remained constant during the reaction.

It is evident that fuels according to the invention may be prepared in an entirely analogous manner by using dispersions in volatile solvents of fluorocarbon compounds.

The reactor shown in the FIGURE consists of a reaction space 1 which is filled with a fuel according to the Example. The container 2 contains sulphur hexafluoride. The container 2 communicates with the reaction space 1 through a control cock 3 and a number of supply ducts 4, two of which are shown in the FIGURE. The reaction space 1 communicates through the exhaust duct 6 and the supply duct 7 with a second space, hereinafter called container 5, which is filled with a lithium-calcium alloy (4 : 1 in gram atoms) and which surrounds the reaction space 1. The reaction space 1 consists of a cylindrical vessel 8 is which a cylinder 9 is placed concentrically. The cylinder 9 is open at either end and does not contact the end walls of the cylindrical vessel 8. The end of the cylinder 9 adjoins the crown of heater tubes 10 of a hot-gas engine. An aperture is provided at the other end between the end of the cylinder 9 and the cylindrical vessel 8. In this manner a circulation conduit is obtained which includes a pump 11 driven by the electric motor 12 shown diagrammatically. The reaction space 1 is in heat-exchanging contact with the container 5. The container 13 contains an inert gas, for example, argon and communicates with the duct 4 through the duct 14 and the control cock 15. The container 13 also communicates with the reserve container 5 through the duct 16 and the compressor 17.

The operation of the reactor is as follows: Initially the reactor is at room temperature, the fuel according to the invention as described in the Example in the reaction space 1 and the lithium-calcium alloy in the container 5 being solid. The mass in the reaction space is now ignited by means of the which is 18 whicis connected to a switch and a current source 20. At the subsequent reaction a temperature of approximately 850° C is reached in the space 1. Subsequently the pump 11 is put into operation, and a circulation in the reaction space as shown by the arrows therein now occurs. The control cocks 3 and 15 are then opened and a constant flow of sulphur hexafluoride mixed with the inert gas under natural pressure is introduced into the reaction space where a reaction takes place immediately in accordance with $Li_{16}Ca_4 - 3\ SF_6 \rightarrow 12LiF + 3\ CaF_2 + 2Li_2S + CaS - 1,980$ kcal. (850° C).

The heat released during the reaction is transferred to the heater tubes 10 and to the lithium-calcium alloy in the reserve container 5. Part of the formed reaction products and the non-converted alloy subsequently flow to the right through the space between cylinder 9 and the wall of the cylindrical space 8, another part of the formed reaction products and the non-converted alloy leave the reaction space through the tube 6 and comes in the reserve container 5. The tube 6 is closed by a plug (not shown) of a metal (lanthanum melting point 840° C) which melts only at the instant when the alloy in the container reaches the operating temperature (850° C). Since the flow speed in the reverse container is smaller than that in the reaction space 1, the reaction products formed whose specific gravity is approximately twice larger than that of the metal alloy, can be separated in this space. The specifically lighter metal alloy flows back into the reaction space through the tube 7.

The inert gas introduced together with the $SF_6$ into the reaction space is collected in the reserve container 5 whence it is pumped back into the container 13, through the duct 16 and the compressor 17. This serves to prevent molten alloy and/or reaction products from coming into the duct 4 upon discontinuation of the $SF_6$ supply.

By leading a portion of the alloy and reaction products at a smaller speed through the reserve container 5 and by causing the reaction products to be separated in that container, it is achieved that the reaction circumstances required for a considerable period of time for full conversion remain substantially constant in the reaction space. The concentration of reaction products in the reaction space 1 steadily increases only after such a quantity of alloy has been converted that the reverse container 5 is substantially filled with the reaction products, so that the conversion speed of the alloy with sulphur hexafluoride is reduced. By admitting comparatively more sulphur hexafluoride, the conversion speed can again be increased. All this may be controlled automatically, for example, by means of a gas cock in duct 4 which is controlled by a thermostat in such a manner that the temperature in the reaction space remains constant.

The invention particularly provides the advantage that the deisred operating temperature can be reached very quickly when using a fuel according to the invention so that the energy source and an engine coupled thereto reach their maximum efficiency within a few seconds.

The fuel according to the invention may be moulded in any desired form having any desired pore volume.

During the reaction in the fuel which brings the temperature of the metal to be converted with SF to the desired value, no evaporation takes place and no gaseous products are formed, thus there is no increase of pressure in the space containing the reacting mass.

The fuels according to the invention are insensitive to mechanical shocks and ignition can only take place by local overheating. Explosions do not occur upon ignition.

What is claimed is:

1. A solid fuel suitable for producing calorific energy by reaction with $SF_6$, said fuel comprising a mixture of a solid or highly viscous halogenated carbon compound in which all the carbon valences not used up by carbon to carbon bonds are either fully saturated with fluorine or partly with fluorine and partly with chlorine and a lithium containing composition wherein lithium is present in a mixture or in an alloy with calcium, the ration of the carbon compound to the lithium containing composition being sufficient only, upon ignition of the composition, to react maximally with 30 percent by weight of the metal present in the lithium containing composition, the heat produced thereby being at least sufficient to melt the reaction products formed as well as any unreacted portion of the lithium containing composition.

2. A fuel as claimed in claim 1, wherein said carbon compound comprises poly (monochlororifluoroethylene) having a mean molecular weight of between approximately 900 and 10,000.

3. A fuel as claimed in claim 2, and having the following composition: 5-25 percent by weight of poly(monochlorotrifluoroethylene) and the remainder lithium-calcium mixture (4:1 in gram atoms).

4. A fuel as claimed in claim 2, and having the following composition:
- 50 percent by weight of Ca,
- 35 percent by weight of Li and
- 15 percent by weight of poly(monochlorotrifluoroethylene) (mean molecular weight approximately 1,000).

5. The solid fuel of claim 1 wherein the lithium containing composition is a mixture or an alloy of 7 parts by weight of lithium and 10 parts by weight of calcium.

6. A method of manufacturing mouldings from a solid fuel suitable for producing calorific energy by reaction with $SF_6$, said fuel comprising a mixture of a solid or highly viscous halogenated carbon compound in which all the carbon valences not used up by carbon to carbon bonds are either fully saturated with fluorine or partly with fluorine and partly with chlorine and a lithium containing composition wherein lithium is present alone or in a mixture or in an alloy with a metal selected from the group consisting of aluminum, calcium, potassium, magnesium and sodium, the ratio of the carbon compounds to the lithium containing composition being sufficient upon ignition of the composition to react maximally with 30 percent by weight of the metal present in the lithium containing composition, the heat being produced thereby being at least sufficient to melt the reaction products formed as well as any unreacted portion of the lithium containing composition, comprising forming said fuel into a moulding the volume of which corresponds to the volume of the fuel at the temperature reached after ignition of the fuel, said fuel being moulded in an atmosphere comprising $SF_6$ or a volatile fluorcarbon compound thereby incorporating into the resultant moulded fuel a desired amount of said $SF_6$ or volatile flurocarbon compound.

* * * * *

PO-1050
(5/69)

UNITED STATES PATENT OFFICE
CERTIFICATE OF CORRECTION

Patent No. 3,791,889    Dated February 12, 1974

Inventor(s) JOHANN SCHRODER

It is certified that error appears in the above-identified patent and that said Letters Patent are hereby corrected as shown below:

In the title page add:

-- [73] Assignee: U.S. Philips Corporation, New York, N.Y. --.

-- [30] Foreign Application Priority Data
Sept. 30, 1968  Netherlands  6,813,990

Column 6, line 54, "ration" should be -- ratio --.

Signed and sealed this 9th day of July 1974.

(SEAL)
Attest:

McCOY M. GIBSON, JR.                    C. MARSHALL DANN
Attesting Officer                       Commissioner of Patents